Nov. 6, 1962
R. F. KRETZ
3,061,916
VEHICULAR PIPE LAYING RAM
Filed Oct. 27, 1958
4 Sheets-Sheet 1
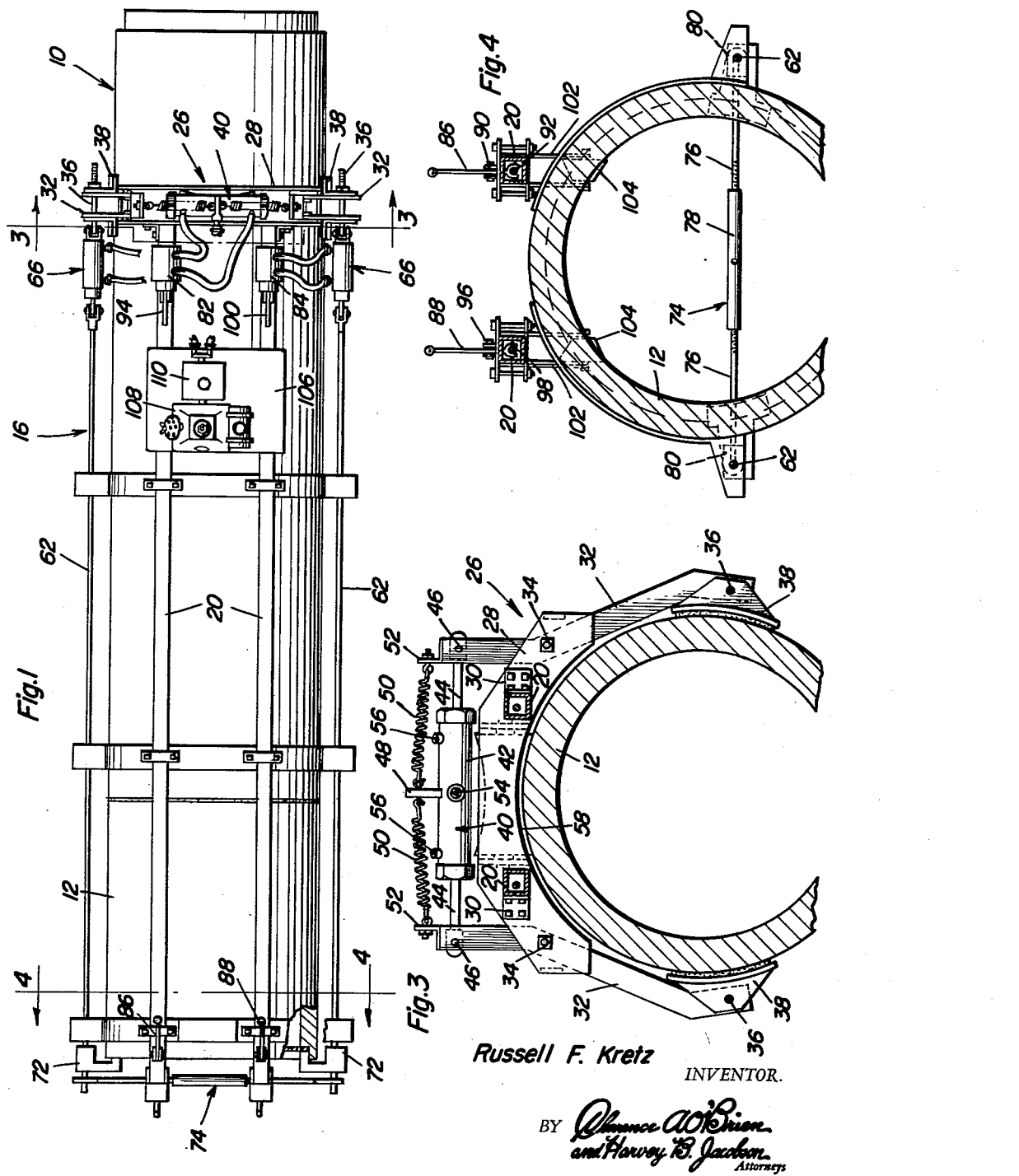
Russell F. Kretz
INVENTOR.
BY *Clarence A. O'Brien*
*and Harvey B. Jackson*
Attorneys

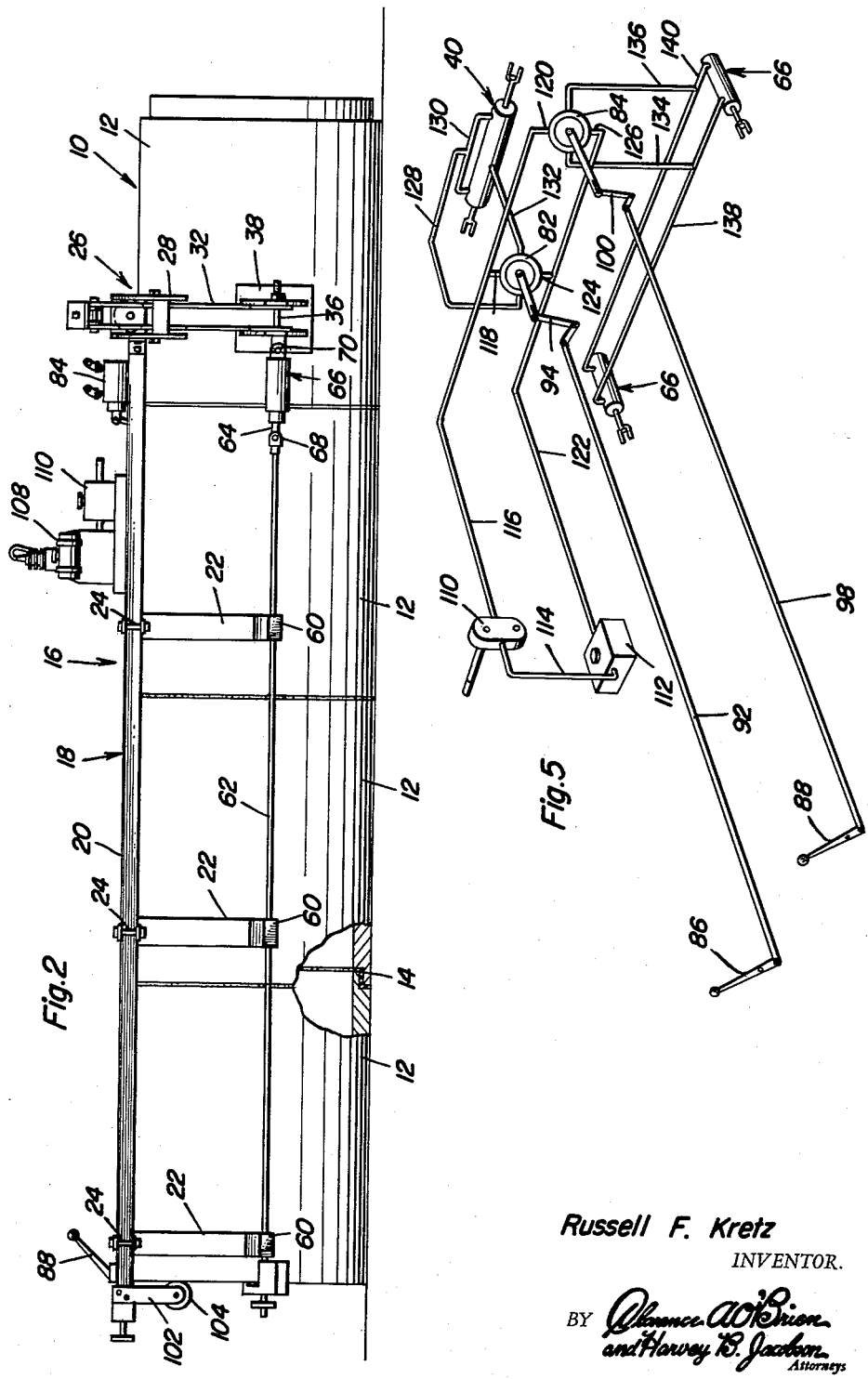

Nov. 6, 1962 R. F. KRETZ 3,061,916
VEHICULAR PIPE LAYING RAM
Filed Oct. 27, 1958 4 Sheets-Sheet 3
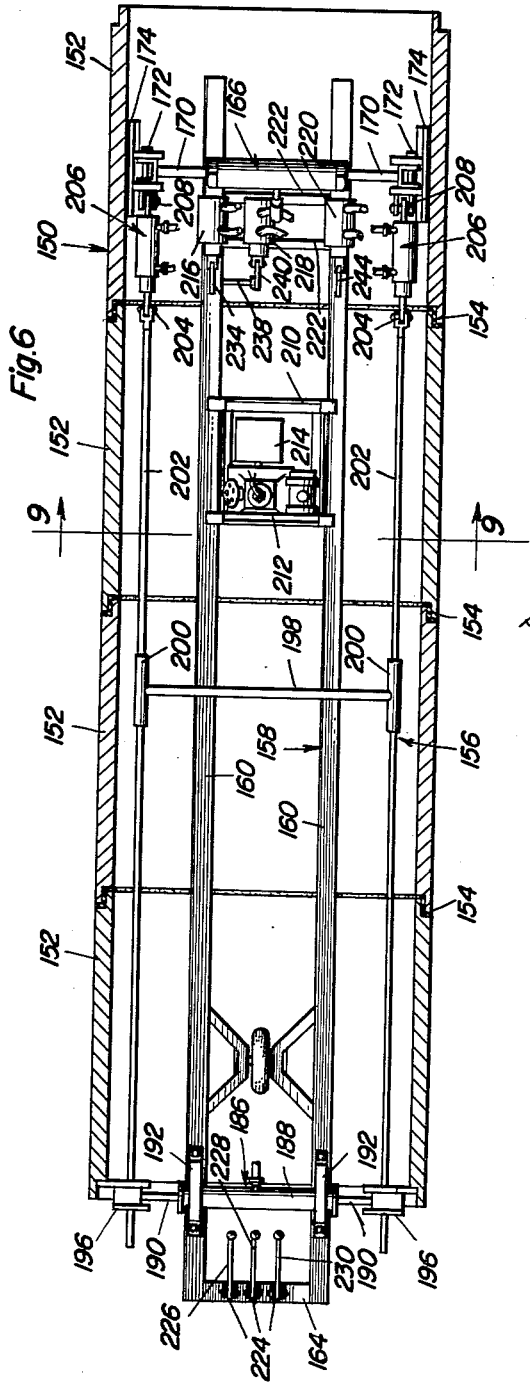
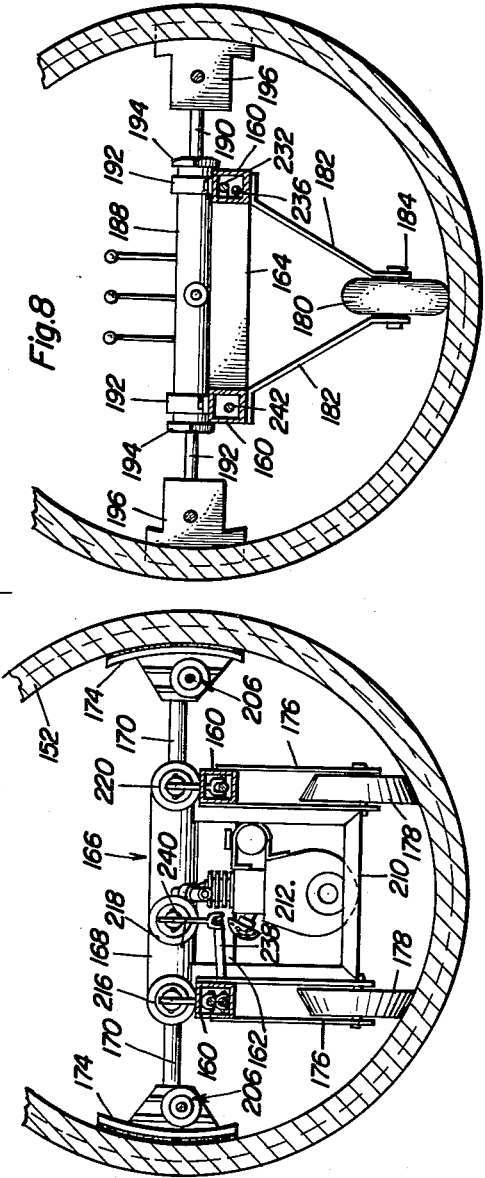
Russell F. Kretz
INVENTOR.
BY Clarence A. O'Brien
and Harvey B. Jackson
Attorneys Nov. 6, 1962  R. F. KRETZ  3,061,916
VEHICULAR PIPE LAYING RAM
Filed Oct. 27, 1958  4 Sheets-Sheet 4
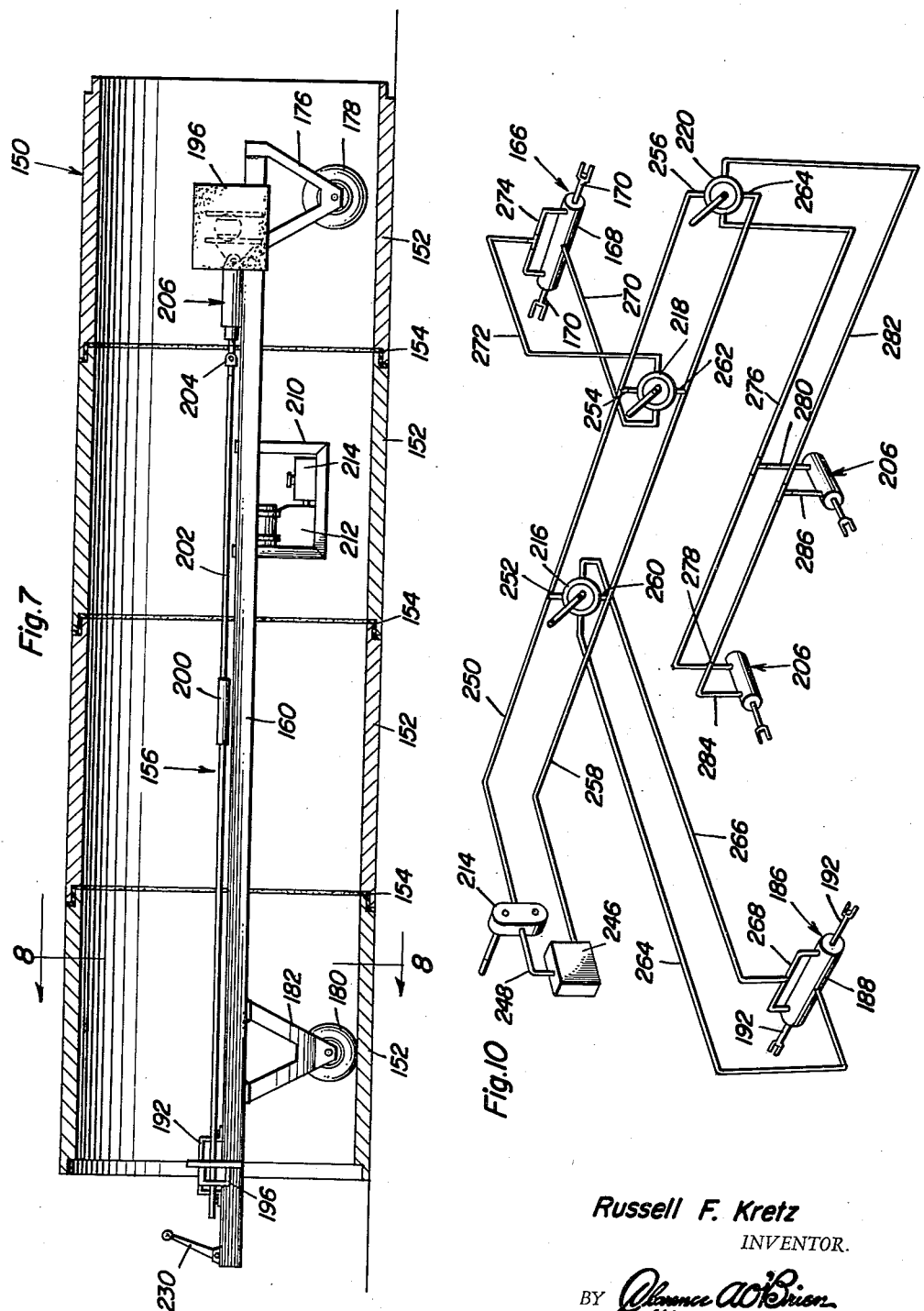
Russell F. Kretz
INVENTOR.

United States Patent Office 3,061,916
Patented Nov. 6, 1962

3,061,916
VEHICULAR PIPE LAYING RAM
Russell F. Kretz, Gilroy, Calif., assignor, by mesne assignments, to Russell F. Kretz, Gilroy, Calif.
Filed Oct. 27, 1958, Ser. No. 769,875
14 Claims. (Cl. 29—238)

This invention relates in general to new and useful improvements in pulling devices, and more specifically to a special ram or pulling device for laying pipe that embodies a vehicle or novel construction.

When pipe is being laid, particularly large diameter concrete pipe, a problem exists in properly joining adjacent pipe sections. This is particularly true where rubber or rubber-like gaskets are being used between pipe sections, which gaskets must be compressed in order to provide the desired water-tight seal. It is therefore the primary object of this invention to provide a vehicular pipe laying ram which is of such a construction that it may be engaged with a previously laid pipe section and when actuated will pull the last placed pipe section into pressure abutted engagement.

Another object of this invention is to provide a vehicular type pipe laying ram which includes an elongated frame having mounted at one end thereof a pipe engaging anchor and at the opposite end thereof a transverse bar having grip lugs for engaging an end portion of a newly laid pipe section and there being provided means connecting the lugs to the pipe engaging anchor whereby when actuated the means will pull the lugs toward the pipe engaging anchor so as to pull the newly laid pipe section into place with respect to previously laid pipe sections.

Another object of this invention is to provide an improved pipe laying ram, the pipe laying ram comprising a unitary assembly actuated by fluid motors whereby the pipe laying ram may be operated by an individual through the mere actuation of controls thereof.

Another object of this invention is to provide a pipe laying ram, the pipe laying ram being of such a construction that it rides on the pipe sections as they are laid and may be readily advanced by an individual into position for pulling a recently laid pipe section into place with respect to previously laid pipe sections.

A further object of this invention is to provide a pipe laying ram which is of a fundamental design such that following the general concept of the design, a pipe laying ram may be constructed for riding on the exterior of pipe sections or a similar pipe laying ram may be provided which rides in the interior of laid pipe sections so that the ram is readily available for pulling into position the newly laid pipe sections.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of a first form of vehicular pipe laying ram and shows the pipe laying ram mounted on the exterior of pipe sections in position for pulling a newly laid pipe section into place;

FIGURE 2 is an elevational view of the pipe section of FIGURE 1, parts of abutted pipe sections being broken away and shows the relationship of the pipe laying ram with respect thereto;

FIGURE 3 is an enlarged vertical transverse sectional view with parts being broken away and taken substantially upon the plane indicated by the section line 3—3 of FIGURE 1 and shows the specific details of a pipe engaging anchor portion of the pipe laying ram, which is used to anchor the ram to the previously laid pipe during the pipe pulling operation;

FIGURE 4 is an enlarged transverse sectional view with parts being broken away taken substantially upon the plane indicated by the section line 4—4 of FIGURE 1 and shows the general details of the pipe laying ram at the end of a newly laid pipe section which is to be abutted and joined with a previously laid pipe section;

FIGURE 5 is a schematic fluid diagram for the pipe laying ram;

FIGURE 6 is a horizontal longitudinal sectional view taken through the sections of a concrete pipe and shows mounted therein a second form of vehicular pipe laying ram, the pipe laying ram being an interior model;

FIGURE 7 is a vertical longitudinal sectional view taken through the pipe sections of FIGURE 6 and shows in elevation the pipe laying ram;

FIGURE 8 is an enlarged fragmentary vertical transverse sectional view taken substantially upon the plane indicated by the section line 8—8 of FIGURE 7 and shows the details of the pipe laying ram at the open end of a newly laid pipe section;

FIGURE 9 is an enlarged fragmentary vertical transverse sectional view taken substantially upon the plane indicated by the section line 9—9 of FIGURE 6 and shows the details of the other end of the pipe laying ram; and FIGURE 10 is a schematic fluid diagram for the pipe laying ram of FIGURE 6.

Referring now to the drawings in detail, it will be seen that there is illustrated in FIGURES 1 and 2 a pipe line which is referred to in general by the reference numeral 10. The pipe line 10 is formed of a plurality of identical pipe sections 12 which are secured together in abutted and joined aligned relation. The pipe sections 12 may be of any desired construction although they are preferably in the form of heavy concrete pipe which is sealed together at adjacent ends by means of a rubber or rubber-like interposed gasket 14. Although the pipe sections 12 are illustrated as lying on a surface, it is to be understood that they will normally be laid in a trench. Since the pipe sections 12 are relatively heavy, a problem exists in properly joining the individual pipe sections being connected together. This is particularly a problem when the pipe sections are lying in a narrow trench. In order to accomplish this, there is provided a pipe laying ram forming the subject matter of this invention which is of the vehicular type being referred to in general by the reference numeral 16.

Pipe laying ram 16 is an exterior model and is intended to be used in conjunction with relatively small diameter pipes, particularly those which are of insufficient diameter to receive a pipe laying ram, of the interior type.

The pipe laying ram 16 includes a frame which is referred to in general by the reference numeral 18. The frame 18 is formed primarily of a pair of longitudinally extending frame rails 20 which are disposed in spaced parallel relation. The frame rails 20 have at longitudinally spaced intervals transversely disposed arcuate supports 22 which are secured thereto by means of suitable fasteners 24.

Positioned at one end of the frame 18 is a pipe engaging anchor which is referred to in general by the reference numeral 26. Referring now to FIGURE 3 in particular, it will be seen that the pipe engaging anchor 26 includes a transverse frame member 28 which is generally arcuate in outline and contoured so as to be spaced slightly above the exterior surface of one of the pipe sections 12. The frame rails 20 terminate at the transverse frame member 28, and are secured thereto by means of suitable brackets 30.

The transverse frame member 28 is generally channelshaped, as is best illustrated in FIGURE 1, and has extending therethrough at opposite ends thereof levers 32. The levers 32 are pivotally mounted on pivot pins 34 extending through the frame member 28. The lower ends of the levers 32 carry pivot pins 36 which mount on the lower ends of levers 32 pipe engaging anchor elements 38.

Secured to the upper part of the transverse frame member 28 is a double-acting fluid motor 40. The fluid motor includes a cylinder 42 which has mounted therein in opposed relation a pair of pistons (not shown) to which there are connected piston rods 44. The piston rods 44 extend through opposite ends of the cylinder 42 and are connected as at 46 to the upper ends of the levers 32.

Extending upwardly from the cylinder 42 centrally thereof is a bracket 48. Connected to opposite sides of the lug 48 are tension springs 50 whose opposite ends are connected to brackets 52 secured to the upper end of the levers 32. The tension springs 50 tend to pivot the levers 32 about the pivot pins 34 in such a manner that the pipe engaging clamp elements 38 are moved out of engagement with the pipe section 12. It is to be understood, however, that when fluid is admitted to the cylinder 42 through a central fitting 54 thereof, the pistons of the fluid motor 40 are moved apart which results in the pivoting of the levers 32 so that the lower ends thereof move towards the pipe section 12 and result in the firm gripping of the pipe section 12 by the pipe engaging anchor elements 38. The fluid motor 40 being of a double-acting type, the cylinder 42 is provided at opposite ends thereof with second fittings 56.

In order to facilitate the movement of the pipe laying ram 16 along the pipe sections 12, there is also carried by the transverse frame member 28 a pipe engaging roller 58. The pipe engaging roller 58 is contoured to correspond to the exterior surface of the pipe section 12 and projects downwardly below the transverse frame member 28 sufficiently to support the remainder of the pipe laying ram 16 out of engagement with the pipe section 12.

As is best shown in FIGURE 2, each of the supports 22 terminates at the lower end thereof in a horizontally disposed sleeve 60. The sleeves 60 are aligned with each other and slidably mounted in the sleeve 60 at each side of the pipe line 10 is a pull rod 62. The pull rod 62 has the right hand end thereof, as viewed in FIGURE 2, connected to a piston rod 64 of a fluid motor 66 by means of a fitting 68. The fluid motor 66 is illustrated as being of the double-acting type. However, if desired, it may be spring loaded so as to urge the piston rod 64 to the left, as viewed in FIGURE 2 and be of a single action type. Each of the fluid motors 66 is pivotally connected by means of fitting 70 to a corresponding one of the pivot pins 36.

Referring now to FIGURES 1 and 4 in particular, it will be seen that mounted on the ends of each rod 62 remote from the fluid motor 66 is a grip lug 72 which is adapted to engage the end of the particular pipe section 12 being laid. Extending transversely between the extreme ends of the rod 62 is a transverse adjusting bar which is referred to in general by the reference numeral 74. The transverse bar 74 includes a pair of rod sections 76 which are connected together by an internally threaded coupling 78, the rod sections 76 being oppositely threaded so that by rotating the coupling 78, the ends of the rods 76 may be moved together or apart. The outer ends of the rods 76 are provided with enlargements 80 through which the rods 62 pass and to which the rods 62 are anchored. The purpose of the transverse bar 74 is to properly position the grip lugs 72 with respect to the pipe section 12.

Mounted on the frame rails 20 adjacent the anchor frame member 28, see FIGURE 1, is a pair of control valves 82 and 84. The control valve 82 controls the actuation of the fluid motor 40 whereas the fluid control valve 84 controls the actuation of the fluid motors 66.

The frame rails 20 are hollow and have mounted at opposite ends thereof control levers 86 and 88 for the valves 82 and 84, respectively. The control lever 86 is connected to its respective frame rail 20 by means of a fitting 90 and has connected thereto a longitudinally extending rod 92 whose opposite end is connected to a lever 94 of the valve 82. The control lever 88 is mounted on the other one of the frame rails 20 by means of a fitting 96 and has connected thereto a longitudinally extending rod 98 which is disposed within its respective frame rail 20. The opposite end of the rod 98 is connected to the lever 100 of the control valve 84. Thus the control valves 82 and 84 may be positioned remote from the left end of the pipe laying ram 16, as viewed in FIGURE 1. By so positioning the controls, the person standing at the end of the newly laid pipe section 12 may be in a position to control the movement of the newly laid pipe section 12 into the proper seating engagement with the previously related pipe section 12.

Depending from the left hand ends of the frame rails 20 are suitable brackets 102 which support wheels or rollers 104. The wheels 104 are particularly contoured so as to correspond to the general exterior surface of the pipe section 12. When the pipe laying ram 16 is in its operative position, the rollers or wheels 104 project beyond the end of the newly laid pipe section 12 and depend below the upper surface thereof. When it is desired to shift the pipe laying ram 16, it is merely necessary to lift the left hand end thereof and to engage the wheels 104 with the exterior surface of the newly laid pipe section 12. The pipe laying ram 16 may then be moved to an out of the way position to the right, as viewed in FIGURE 1, until the next pipe section 12 is laid in position. The ram 16 may then be moved to the left into position with respect to the newly laid pipe section 12.

Mounted on the frame rails 20 adjacent the anchor frame member 28 is a platform 106 on which is mounted a suitable power unit 108 which is preferably in the form of a gasoline engine. The power unit 108 is connected to a fluid pump 110. Thus, the pipe laying ram 16 constitutes a unitary assembly.

Referring now to FIGURE 5 in particular, it will be seen that there is illustrated the fluid schematic for the pipe laying ram 16. The fluid system of pipe laying ram 16 includes the fluid motors 40 and 66, the control valves 82 and 84 and the pump 110. The pump 110 is connected to a fluid reservoir 112 by means of a fluid line 114. Extending from the pump 110 is a main supply line 116 which is connected to the control valve 82 by means of a fluid line 118 and to the control valve 84 by means of the fluid line 120. The fluid system also includes a main return line 122 which is connected to the reservoir 112. The main return line 122 is also connected to the control valve 82 by means of a fluid line 124 and to the control valve 84 by means of fluid line 126.

The control valve 82 is connected to the fluid motor 40 by means of a fluid line 128 which has a bifurcated end portion 130 connected to opposite ends of the fluid motor 40. Connected to the central portion of the fluid motor 40 is a fluid line 132 whose opposite end is connected to the control valve 82. The control valve 82 is of the four-way type and will thus communicate the fluid motor 40 to the remainder of the fluid system in such a manner that the piston rod of the fluid motor 40 may be selectively retracted or extended.

The control valve 84 is also of the four-way type and has extending therefrom fluid lines 134 and 136. The fluid line 134 is connected to the transverse fluid line 138 whose opposite ends are connected to the fluid motors 66. The fluid line 136 is connected to a fluid line 140 which is similar to the fluid line 138 and whose opposite ends are connected to the fluid motors 66. Thus by actuating the control valve 84, the fluid motors 66 may be actuated simultaneously.

The fluid system of FIGURE 5 is that which would be required when hydraulic fluid is used. On the other hand, should air be used, then the reservoir 112 and all of the return lines 124, 122 and 126 may be eliminated and the control valves 82 and 84 may exhaust to the atmosphere.

Referring now to FIGURES 6 and 7 in particular, it will be seen that there is illustrated a second pipe line 150. The pipe line 150 differs from the pipe line 10 only in that individual pipe sections 152 thereof are of a much larger diameter than the pipe sections 12. The individual pipe sections 152 will most likely be formed of concrete and the individual pipe sections 152 will be sealed together by means of gaskets 154. In order that the last laid pipe section 152 may be pulled into the desired position with respect to the previously laid pipe section 152, there is provided a second form of pipe laying ram which is referred to in general by the reference numeral 156.

The pipe laying ram 156 is very similar in principle and construction to the pipe laying ram 16. However, whereas the pipe laying ram 16 is an exterior model and is intended to ride on the exterior surfaces of the pipe sections with which it is associated, the pipe laying ram 156 is an interior model and is intended to travel within the pipe section with which it is associated.

The pipe laying ram 156 includes a frame which is referred to in general by the reference numeral 158. The frame 158 includes a pair of longitudinally extending frame rails 160 which are of a tubular or channel construction. The right hand ends of the frame rails 160 are connected together by means of a transverse frame member 162. The left hand end of the frame rails 160 are connected together by means of a transverse frame member 164.

Extending between the frame rails 160 in generally overlying relation to the transverse frame member 162 is a double double-acting fluid motor 166 which is very similar to the fluid motor 40. The fluid motor 166 includes a cylinder 168 which has extending from opposite ends thereof piston rods 170 which are connected to a pair of opposed pistons (not shown) mounted within the cylinder 168.

Pivotally connected to the outer ends of the piston rods 170 by means of piston pins 172 are pipe engaging anchor elements 174. Pipe engaging anchor elements 174 are urged into compressive engagement with one of the pipe sections 152 by the action of the fluid motor 166 so as to firmly anchor the pipe laying ram 156 relative thereto.

In order that the pipe engaging anchor elements 174 may engage the mid-portion of the pipe section 152, and also to facilitate the movement of the pipe laying ram 156 through the pipe line 150, there is secured to the frame rails 160 in the vicinity of the transverse frame member 162 a pair of depending brackets 176. The brackets 176 support wheels 178 which are contoured to correspond to the interior surface of the pipe section 152. The wheels 178 support the cylinder 168 of the fluid motor 166 and anchor elements at substantially the mid-height of the pipe section 152.

The left hand end of the pipe laying ram 156 is supported by means of a center wheel 180 which is supported from the frame rails 160 by depending brackets 182. The brackets 182 are connected together by member 184 which functions as an axle for the wheel 180.

Extending transversely between the frame rails 160 in general overlying relation adjacent the left hand end thereof is a second double double-acting fluid motor which is referred to in general by the reference numeral 186. The fluid motor 186 includes a cylinder 188 in which there is mounted in opposed relation a pair of pistons (not shown) to which there are connected piston rods 190 which extend from opposite ends of the cylinder 188. The cylinder 188 is retained in position by resting upon the frame rails 160 and by a pair of elongated guides 192, which overlie the cylinder 188. Furthermore, the cylinder 188 is provided with end caps 194 which engage the outer surfaces of the frame rails 160.

Secured to the outer ends of the piston rods 190 are grip lugs 196 which are particularly adapted to engage the end of the pipe section 152 in diametrically opposite relation.

Extending transversely of the frame 158 at the midpoint thereof is a support bar 198 which is provided at opposite ends thereof with longitudinally extending sleeves 200. Slidably supported in the sleeves 200 are rods 202. The right hand ends of the rods 202 are connected by means of fittings 204 to fluid motors which are referred to in general by the reference numeral 206. Each of the fluid motors 206 is of the double-acting type and is connected by means of a fitting 208 to a respective one of the pivot pins 172. Thus the fluid motors 206 are anchored relative to the pipe engaging anchor elements 174. The opposite ends of the rods 202 are suitably secured to the grip lugs 196. Thus when the fluid motors 206 are actuated, the rods 202 may be moved to the right so that the rods 202 serve to pull the last laid pipe section 152 into position relative to the previously laid pipe sections 152.

Suspended below the frame 158 by means of a suitable supporting frame 210 is a power unit 212 which is preferably in the form of a gasoline engine. Also mounted in the frame 210 is a fluid pump 214. The fluid pump 214 is connected to control valves 216, 218 and 220. The control valves 216 and 220 are mounted on top of the frame rails 160 and the control valve 218 is mounted intermediate the control valves 216 and 220 on a pair of straps which extend transversely between the frame rails 160. The control valve 216 controls the actuation of the fluid motor 186. The control valve 218 controls the actuation of the fluid motor 166. The control valve 220 functions to control the operation of the fluid motors 206.

The transverse frame member 164 is of a tubular or channel construction similar to the longitudinal frame rails 160. Mounted on the transverse frame member 164 in transversely spaced relation is a plurality of fittings 224. Carried by the fittings 224 are control levers 226, 228 and 230. The control lever 226 is connected to a control rod 232 which extends through one of the frame rails 160 and is connected to a lever 234 of the valve 216. Thus the control lever 226 may be used to control the position of the valve 216. The control lever 228 is connected to a rod 236 which extends through the same frame rail 160 as the rod 232. The rod 236 has connected to the opposite end thereof offset linkage 238 which is in turn connected to the lever 240 of the control valve 218. Thus, the lever 228 may be used to control the position of the valve 218.

Extending through the other one of the frame rails 160 is a rod 242 which is connected to the control lever 230. The opposite end of the rod 242 is connected to a lever 244 of the control valve 220. Thus the control lever 230 may be used for positioning the control valve 220.

Referring now to FIGURE 10, it will be seen that the fluid system of the pipe laying ram 156 includes a reservoir 246 which is connected to the fluid pump 214 by means of a fluid line 248. Extending from the fluid pump 214 is a fluid supply line 250. The fluid supply line 250 is connected to the control valve 216 by means of the fluid line 252, to the control valve 218 by means of a fluid line 254, and to the control valve 220 by means of a fluid line 256. Connected to the reservoir 246 is a main return line 258. The return line 258 is connected to the control valve 216 by means of a return line 260, to the control valve 218 by means of a return line 262, and to the control valve 220 by means of a return line 264.

Inasmuch as the control valve 216 controls the actuation of the fluid motor 186, there extends between the control valve 216 in a central part of the cylinder 188 of the fluid motor 186 a fluid line 264. A similar line 266 is connected by a bifurcated line 268 which is in turn connected to the opposite ends of the cylinder 188. The opposite end of the fluid line 266 is connected to the control valve 216. Inasmuch as the control valve 216 is of the four-way type, it will be seen that it may be positioned so as to actuate the fluid motor 186 so as to either extend or retract the piston rods 190 thereof.

The control valve 218 controls the actuation of the fluid motor 166. Accordingly, the central part of the cylinder 168 has connected thereto a fluid line 270 whose opposite end is connected to the control valve 218. A second fluid line 272 extends from the control valve 218 to the fluid motor 166. The fluid line 272 terminates in a bifurcated portion 274 which is connected to opposite ends of the cylinder 168. Like the control valve 216, the control valve 218 is of the four-way type.

The control valve 220 controls the actuation of both of the fluid motors 206. Extending from the control valve 220 is a fluid line 276 which is connected to the left hand fluid motor 206 by means of a fluid line 278 to the right hand fluid motor 206 by means of a fluid line 280. A second fluid line 282 extends from the control valve 220 and is connected to opposite ends of the fluid motors 206 by means of fluid lines 284 and 286. The control valve 220 is also of the double-acting type.

Although the fluid system for the pipe laying ram 156 has been illustrated as being of the closed system type primarily to be used in conjunction with hydraulic fluid, it is to be understood that air may be used as the fluid. In such event, the return lines 258, 260, 262 and 264 would be eliminated together with reservoir 246. The control valves 216, 218 and 220 will then exhaust to the atmosphere.

At this time it is pointed out that each of the pipe laying rams 16 and 156 has been illustrated and described as having only one pipe engaging anchor. However, in certain instances because of the size of the pipe section to be moved and the load imposed upon the pipe laying ram, it will be necessary to provide the pipe laying ram with a plurality of such pipe engaging anchors. This will require merely a duplication of the pipe engaging anchors illustrated and described.

From the foregoing, it will be readily apparent that there has been devised suitable pipe laying rams which are of such a nature whereby, depending upon the particular model, the pipe laying ram may travel either exteriorly of the pipe sections or within the pipe sections. Further, the pipe laying rams are provided with their own support wheels or rollers so that they may travel on the previously laid pipe sections thus they may be manipulated by an individual. In addition to this, the controls for the pipe laying ram are positioned whereby they are readily available to one standing at the open end of the newly laid pipe section so that the operator of the pipe laying ram may be in an out of the way position and at the same time in a position for the pipe laying operation.

When long lengths of pipe, such as steel pipe, are laid, it may be advisable to make the frame of the pipe laying ram shorter and to replace the grip lugs and the transverse pipe pulling bar thereof with a pipe engaging anchor of the type used at the anchored end of the frame. Thus it will not be necessary for the pipe laying ram to engage a pipe section at its end only.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicular pipe laying ram for pulling into aligned and endwise abutting engagement adjacent sections of pipe having continuous, smooth and unbroken cylindrical surfaces; said ram comprising
   (a) an elongated frame having anchor means and gripping means at the opposite ends thereof and
   (b) actuating means extending longitudinally of said frame and connected to said anchor and gripping means for effecting relative movement between the latter,
   (c) said frame including a pair of longitudinally extending rails disposed in side-by-side relation and adapted for disposition above a horizontally extending pipe and at the opposite sides of a vertical plane extending through the axis thereof,
   (d) arcuate supports secured to and extending transversely of said rails laterally therebeyond and of sufficient length and shape adapted to partially and snugly embrace the upper portions of the circumference of a pipe,
   (e) said anchor means comprising a frame member fixedly secured to and extending transversely of said rails,
   (f) anchor levers having their mid-portions pivoted to said frame member,
   (g) anchor elements secured each to an end of an anchor lever and having arcuate gripping surfaces complementary to said cylindrical surface and adapted to frictionally clamp opposite sides of the latter,
   (h) power operating means pivotally secured to, disposed between and supported solely by the other ends of said anchor levers,
   (i) said actuating means including a pair of pull rods,
   (j) means supporting and journaling said pull rods upon opposite sides of said frame and at the lower ends of said arcuate supports,
   (k) power operating means each connected to said anchor frame member and to one of said pull rods for effecting longitudinal movement of the latter,
   (l) said gripping means including a pair of gripping lugs each secured to one of said pull rods and positioned for engagement with the end of a pipe section which is to be drawn into abutted engagement with a previously laid pipe section.

2. The combination of claim 1 wherein said elongated frame is of a length greater than the combined length of a pair of pipe sections whereby the anchor means may be secured upon a pipe section which is disposed inwardly of a pipe line end section against which a newly placed section when engaged by said gripping means is to be abutted.

3. The combination of claim 1 wherein said pull rod power operating means are each secured to one of said anchor elements.

4. The combination of claim 1 including common pivot means for connecting an anchor element to its anchor lever and a pull rod to the anchor element.

5. The combination of claim 1 including a longitudinally extensible adjusting member extending transversely between and terminally secured to said pull rods.

6. The combination of claim 1 wherein said anchor frame member power operating means and said pull rod power operating means comprise fluid motors, means for supplying fluid under pressure to said motors, control means for each of said power operating means including manually operable means mounted on said frame at the gripping means.

7. The combination of claim 6 wherein said rails are hollow, said control means including a control rod movably housed in said rails.

8. The combination of claim 1 including support rollers journaled upon said frame at opposite ends thereof and adapted to be positioned for engagement with and movement upon the top surface of a pipe line for shifting the ram thereon.

9. The combination of claim 1 including a support structure mounted upon said frame, means mounted on said support structure and connected to said power operating means for supplying power thereto.

10. The combination of claim 1 wherein each of said gripping lugs and anchor elements are positioned for engaging said pipe surface at locations adjacent the mid-height of the pipe sections.

11. A vehicular pipe laying ram for pulling into aligned and endwise abutting engagement adjacent sections of pipe having continuous, smooth and unbroken cylindrical surfaces; said ram comprising
   (a) an elongated frame having anchor means and gripping means at the opposite ends thereof and
   (b) actuating means extending longitudinally of said frame and connected to said anchor and gripping means for effecting relative movement between the latter,
   (c) said frame including a pair of longitudinally extending hollow rails disposed in side-by-side relation and adapted for disposition adjacent opposite sides of a pipe,
   (d) supports extending transversely between and secured to said rails and bracing and rigidifying the latter,
   (e) said anchor means being fixedly secured to and extending transversely of said rails,
   (f) said anchor means including a fluid motor,
   (g) piston rods slidable in said motor and projecting from the opposite ends thereof,
   (h) anchor elements each secured to one of said piston rods and having arcuate gripping surfaces adapted to frictionally clamp opposite sides of said surface of one pipe section,
   (i) said actuating means including a pair of pull rods,
   (j) means supporting and journaling said pull rods upon opposite sides of said frame,
   (k) power operating means each connected to said anchor means and to one of said pull rods for effecting longitudinal movement of the latter,
   (l) said gripping means including a pair of gripping lugs each secured to one of said pull rods and positioned for engagement with the end of the other pipe section which is to be drawn into abutted engagement with the previously laid said one pipe section,
   (m) control means for said power operating means and for said fluid motor including a pair of control rods each slidably housed in one of said rails,
   (n) handles at the ends of said rails adjacent said gripping means with each handle being connected to the associated control rod.

12. The combination of claim 11 including supporting wheels mounted on said frame for movably supporting the latter.

13. The combination of claim 11 wherein said anchor elements and grip lugs are disposed at substantially the mid-height of a pipe to be handled.

14. A vehicular pipe laying ram for pulling into aligned and endwise abutting engagement adjacent sections of pipe having continuous, smooth and unbroken cylindrical surfaces; said ram comprising (a) an elongated frame having anchor means and gripping means at the opposite ends thereof and
   (b) actuating means extending longitudinally of said frame and connected to said anchor and gripping means for effecting relative movement between the latter,
   (c) said frame including a pair of longitudinally extending hollow rails disposed in side-by-side relation and adapted for disposition adjacent opposite sides of a pipe,
   (d) supports extending transversely between and secured to said rails and bracing and rigidifying the latter,
   (e) said anchor means being fixedly secured to and extending transversely of said rails,
   (f) said anchor means including a fluid motor,
   (g) piston rods slidable in said motor and projecting from the opposite ends thereof,
   (h) anchor elements each secured to one of said piston rods and having arcuate gripping surfaces adapted to frictionally clamp diametrically opposed surfaces of said pipe,
   (i) said actuating means including a pair of pull rods,
   (j) means supporting and journaling said pull rods upon opposite sides of said frame,
   (k) power operating means each connected to said anchor means and to one of said pull rods for effecting longitudinal movement of the latter,
   (l) said gripping means including a pair of gripping lugs each secured to one of said pull rods and positioned for engagement with the end of a pipe section which is to be drawn into abutted engagement with a previously laid pipe section, said gripping means including a fluid motor connected between said gripping lugs for positively extending and retracting said gripping lugs.

References Cited in the file of this patent
UNITED STATES PATENTS

| | | |
|---|---|---|
| 409,008 | Breymann | Aug. 13, 1889 |
| 889,315 | Kenyon | June 2, 1908 |
| 1,240,288 | Woodward | Sept. 18, 1917 |
| 1,615,008 | Ferguson | Jan. 18, 1927 |
| 1,894,835 | Smith et al. | Jan. 17, 1933 |
| 1,895,132 | Minor | Jan. 24, 1933 |
| 1,910,138 | Van Hooydonk | May 23, 1933 |
| 2,501,242 | Smith | Mar. 21, 1950 |
| 2,502,826 | Cohn | Apr. 4, 1950 |
| 2,669,773 | Price | Feb. 23, 1954 |
| 2,737,140 | Totten | Mar. 6, 1956 |
| 2,805,319 | Totten | Sept. 3, 1957 |
| 2,821,317 | Locke | Jan. 28, 1958 |
| 2,823,947 | Delzer | Feb. 18, 1958 |
| 2,841,297 | Washabaugh | July 1, 1958 |
| 2,862,756 | Larson | Dec. 2, 1958 |
| 2,895,299 | Washabaugh | July 21, 1959 |
| 2,915,282 | Hixon | Dec. 1, 1959 |
| 2,954,136 | Butler et al. | Sept. 27 1960 |
| 2,954,603 | Moberly et al. | Oct. 4, 1960 |
| 2,958,125 | Nichols | Nov. 1, 1960 |